US006545256B1

United States Patent
Ishizu et al.

(10) Patent No.: US 6,545,256 B1
(45) Date of Patent: Apr. 8, 2003

(54) LIGHT RECEIVING MODULE AND RADIATION DETECTING APPARATUS EQUIPPED WITH THE SAME

(75) Inventors: Tomohiro Ishizu, Shizuoka-ken (JP); Tetsuya Morita, Shizuoka-ken (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/553,020

(22) Filed: Apr. 20, 2000

(51) Int. Cl.⁷ .................................................. H01J 40/14
(52) U.S. Cl. ................. 250/207; 250/206.1; 250/361 R
(58) Field of Search .................... 250/207, 206.1, 250/363.01, 361 R, 214 VT; 330/42, 366, 368, 369, 366.01

(56) References Cited

U.S. PATENT DOCUMENTS

| | | | |
|---|---|---|---|
| 4,396,859 A | 8/1983 | Butterwick | 313/240 |
| 5,070,249 A | 12/1991 | White | 250/483.1 |
| 5,523,556 A | * 6/1996 | Meddaugh et al. | 250/207 |
| 5,719,390 A | * 2/1998 | Tateishi et al. | 250/207 |
| 6,333,502 B1 | * 12/2001 | Sumita et al. | 250/363.01 |

FOREIGN PATENT DOCUMENTS

| | | |
|---|---|---|
| GB | 967811 | 6/1960 |
| GB | 2 252 157 | 7/1992 |
| JP | 11-38148 | 2/1999 |

* cited by examiner

Primary Examiner—Robert H. Kim
Assistant Examiner—Pamela R. Hobden
(74) Attorney, Agent, or Firm—Morgan, Lewis & Bockius LLP

(57) ABSTRACT

The present invention relates to a light-receiving module of a heat-resistant, vibration-resistant type for use in petroleum exploration or the like, and a radiation detecting apparatus equipped with the light-receiving module. The light-receiving module comprises a photomultiplier having a faceplate and a stem opposing each other, a bleeder circuit board provided so as to sandwich the stem together with the faceplate and electrically connected to the photomultiplier, a module case provided so as to accommodate the photomultiplier and the bleeder circuit board, said module case having an opening for exposing the faceplate of the photomultiplier, a step provided on an inner surface of the module case, and a stopper seated on the step, defining the position of the photomultiplier in the module case.

16 Claims, 13 Drawing Sheets

LIGHT RECEIVING MODULE AND RADIATION DETECTING APPARATUS EQUIPPED WITH THE SAME

BACKGROUND OF THE INVENTION

1. Field of the Invention

The present invention relates to a light-receiving module of a heat-resistant, vibration-resistant type for use in petroleum exploration and a radiation detecting apparatus equipped with the same.

2. Related Background Art

Figure 1:
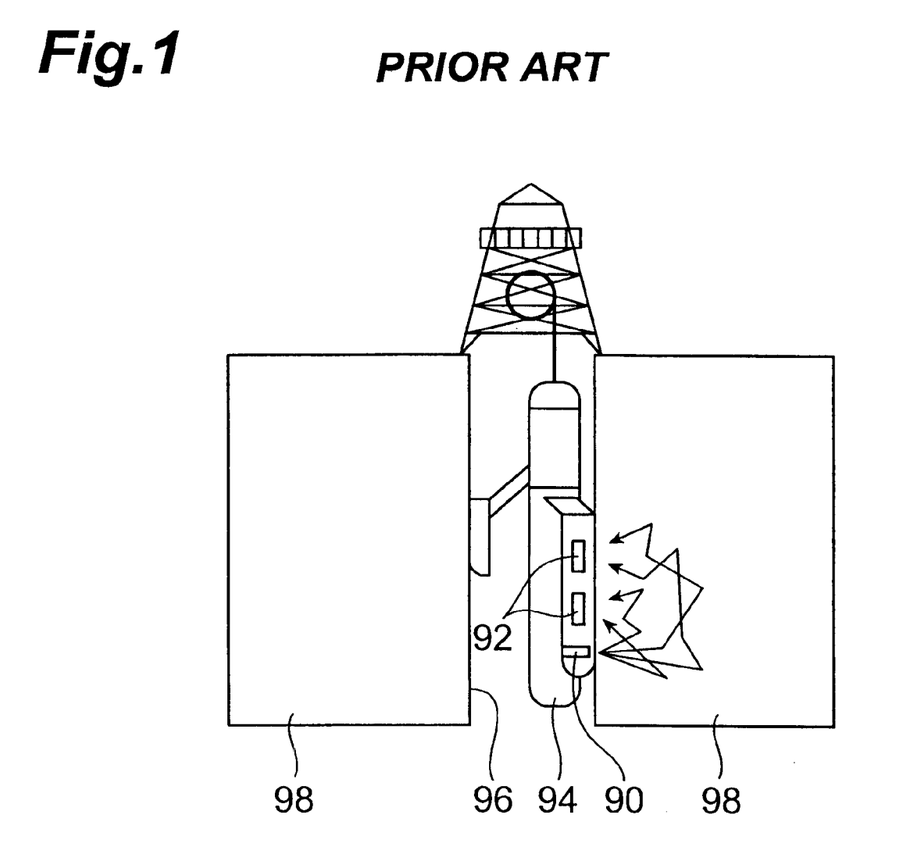
FIG. 1 is a view showing schematically an action of petroleum exploration using a radiation detecting apparatus.

The petroleum exploration is commonly carried out, as shown in FIG. 1, with a probe 94, which comprises a radiation source 90 and a radiation detecting apparatus 92 mounted therein, by lowering into a drilled or drilling well bore 96 and operated to measure and analyze scattered rays or a level of natural radiation derived from a stratum 98. The radiation detecting apparatus 92 for use in the petroleum exploration is operated under hostile conditions with a higher temperature (150 to 200° C.) and an unfavorable degree of vibration in such an oil well drilled deeply under the ground or in a drilling module for the petroleum drilling.

SUMMARY OF THE INVENTION

Such conventional radiation detecting apparatuses however have a drawback that its accuracy for detecting the radiation may decline during its operation.

The present inventors have investigated causes of declination in the accuracy of the radiation detection during the operation of the conventional radiation detecting apparatuses. It was then found that one of the causes was displacement of a photomultiplier installed in the radiation detecting apparatus which had been triggered by external environmental events.

It is thus an object of the present invention to provide a light-receiving module having an improved structure for effectively minimizing declination in the detecting accuracy during the operation and a radiation detecting apparatus equipped with the light-receiving module.

The light-receiving module according to the present invention comprises a photomultiplier having a faceplate and a stem opposing each other, a bleeder circuit board provided so as to sandwich the stem together with the faceplate and electrically connected to the photomultiplier, a module case provided so as to accommodate the photomultiplier and the bleeder circuit board, the module case having an opening for exposing the faceplate of the photomultiplier, a step provided on an inner surface of the module case, and a stopper seated on the step, defining the position of the photomultiplier in the module case. The light-receiving module allows the stopper seated on the step to define the position of the photomultiplier in the module case.

The step provided on the inner surface of the module case may preferably function as the stopper. As a result, the step can function as the stopper, thus reducing the number of the required components.

The stopper may also have a contact surface in contact with the stem of the photomultiplier, and a projection may be formed on the contact surface. Since the stem of the photomultiplier is in contact with the contact surface of the stopper, the position of the photomultiplier along a direction vertical to the faceplate can favorably be defined. Also, as its side wall is in contact with the projection provided on the contact surface, the photomultiplier can precisely be positioned along a direction parallel with the faceplate.

The stopper may also have a contact surface in contact with the stem of the photomultiplier, the contact surface being tilted with respect to a center axis of the module case. Accordingly, inclination of the faceplate of the photomultiplier to the opening of the module case can favorably be determined by controlling the position of the stem directly on the contact surface of the stopper.

Also, the stopper may be made of one of polyamide-imide resin and polyimide resin. This allows the stopper to be enhanced in the heat resistance, the physical strength and the electric non-condactance.

Preferably, a space in the module case where the bleeder circuit board is accommodated is filled with a potting compound. This will protect and hold the bleeder circuit board at its position in the module case.

More preferably, a space between the side wall of the photomultiplier and the module case may also be filled with a potting compound. This will prevent displacement of the photomultiplier in the module case.

A radiation detecting apparatus according to the present invention comprises a scintillator for converting incident radiation into light, a light-receiving module described above, having the faceplate in direct contact with the scintillator, a housing for accommodating the scintillator and the light-receiving module, and means for pressing the light-receiving module against the scintillator. In the present radiation detecting apparatus, the light-receiving module is pressed against the scintillator in a state that the faceplate is in contact with the scintillator. Accordingly, the photomultiplier can correctly be positioned between the scintillator and the stopper, hence ensuring the coupling between the light-receiving module and the scintillator under hostile conditions of a higher temperature and an unfavorable degree of vibration.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCTIPRION OF THE PREFERRED EMBODIMENTS

Preferred embodiments of a light-receiving module according to the present invention will be described in more detail referring to FIGS. 2, 3A, 3B, 4 to 13. Like components are denoted by like numerals throughout the drawings and their explanation will not be repeated.

Figure 2:
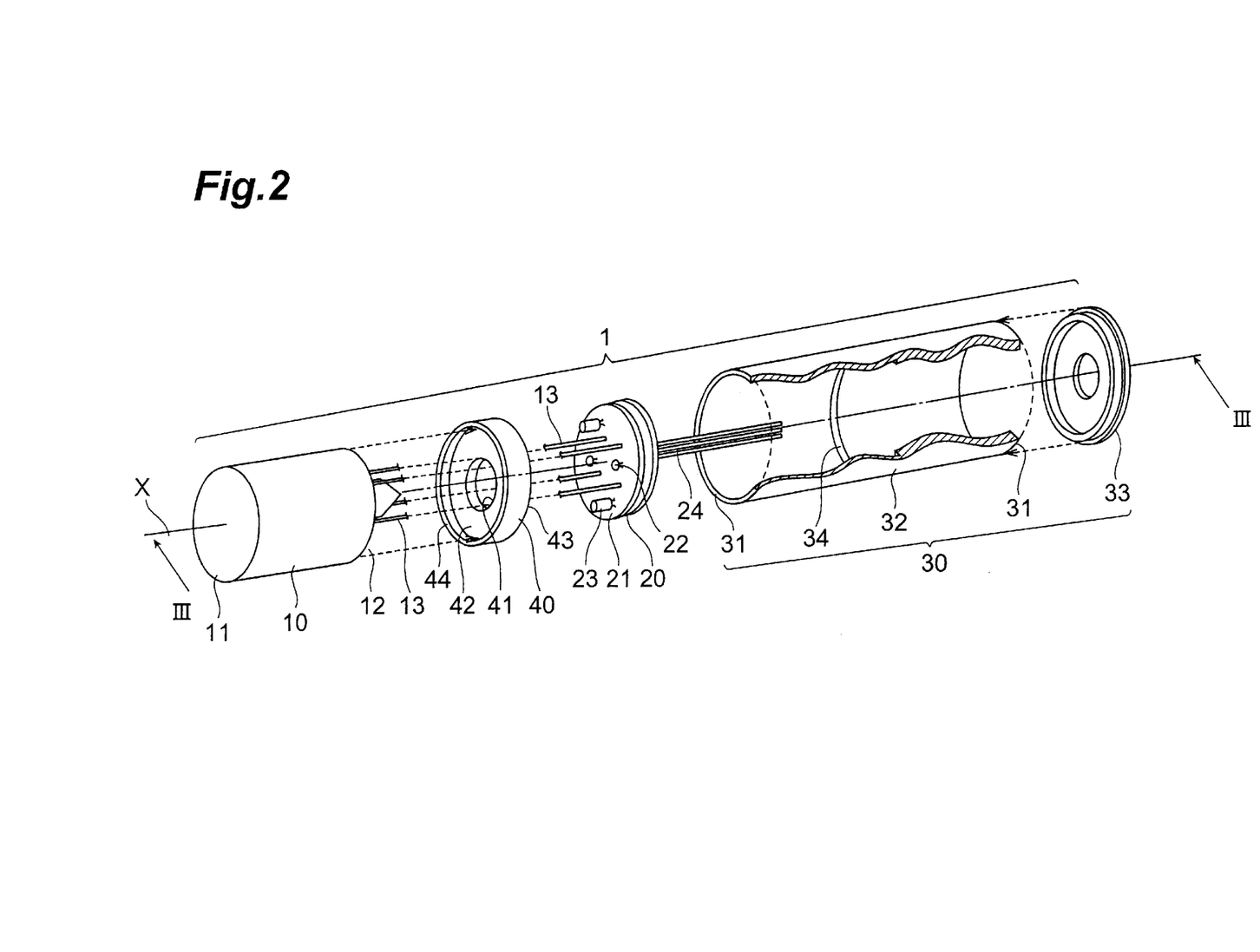
FIG. 2 is a view showing a step of assembling a first embodiment of a light-receiving module according to the present invention.
Figure 3A:
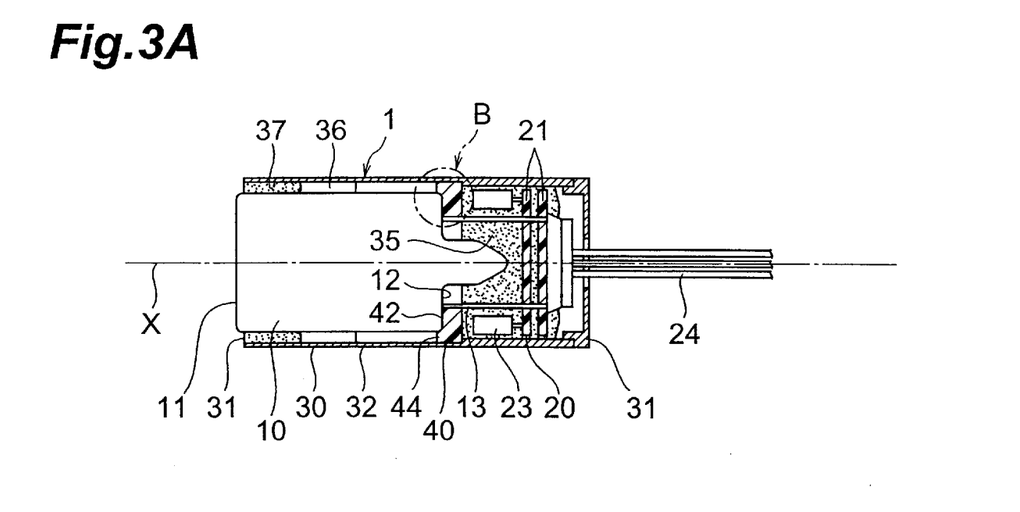
FIG. 3A is a cross sectional view of the light-receiving module of the first embodiment taken along the line III—III of FIG. 2

FIG. 2 is a view of an assembly step showing a first embodiment of the light-receiving module according to the present invention. FIG. 3A is a cross sectional view of the light-receiving module taken along the line III—III in FIG. 2.

In FIGS. 2 and 3A, the light-receiving module 1 comprises a photomultiplier 10, a bleeder circuit board 20, a module case 30, and a stopper 40 which all are aligned along the center axis X of the module case 30.

The photomultiplier 10 is of so-called a head-on type having a faceplate 11 for receiving light and a stem 12 opposing each other. The photomultiplier 10 is contemplated particularly in its photoelectric surface, dynode, and electrode structure (these three are not shown) for providing its performance when operated under high-temperature, vibrating conditions.

The bleeder circuit board 20 supplies dynodes in the photomultiplier 10, not shown, with a voltage having a potential gradient. The bleeder circuit board 20 has resistors 22 and capacitors 23 connected on a disk-shaped substrate 21 made of e.g. a resin.

The module case 30 comprises a cylindrical case body 32 made of an austenite stainless steel (so-called SUS steel) and having circular openings 31 provided at both ends thereof and a cap 33 closing one of the openings 31. The case body 32 of the module case 30 consists of a thin wall region and a thick wall region formed e.g. by machining. There is provided an annular step 34 between the thin and thick wall regions. The cap 33 is mounted to close up the opening 31 of the thick wall end of the case body 32.

Figure 4:
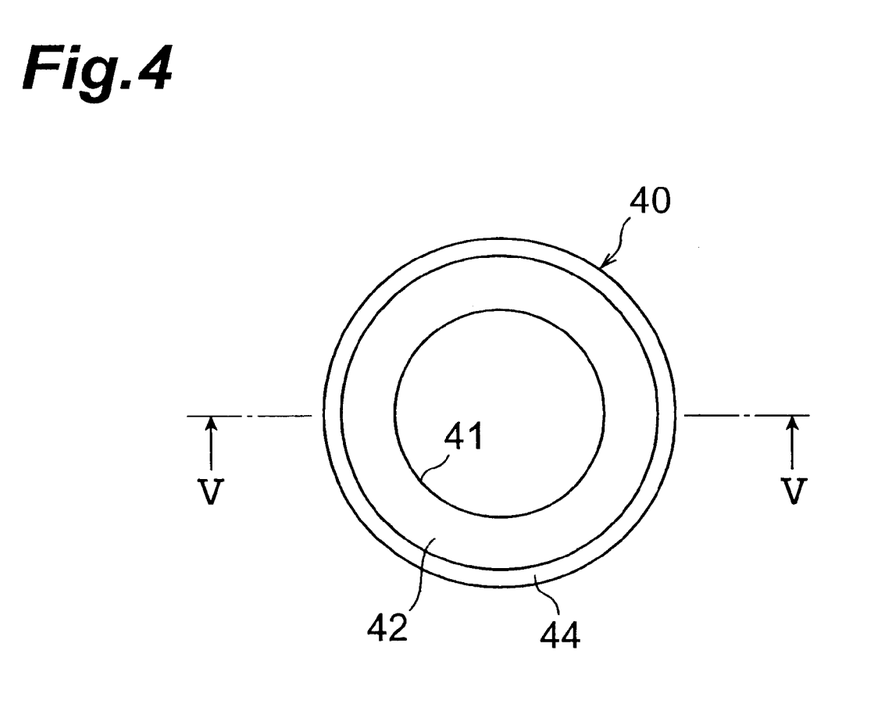
FIG. 4 is a plan view of a stopper in the light-receiving module of the first embodiment.
Figure 5:
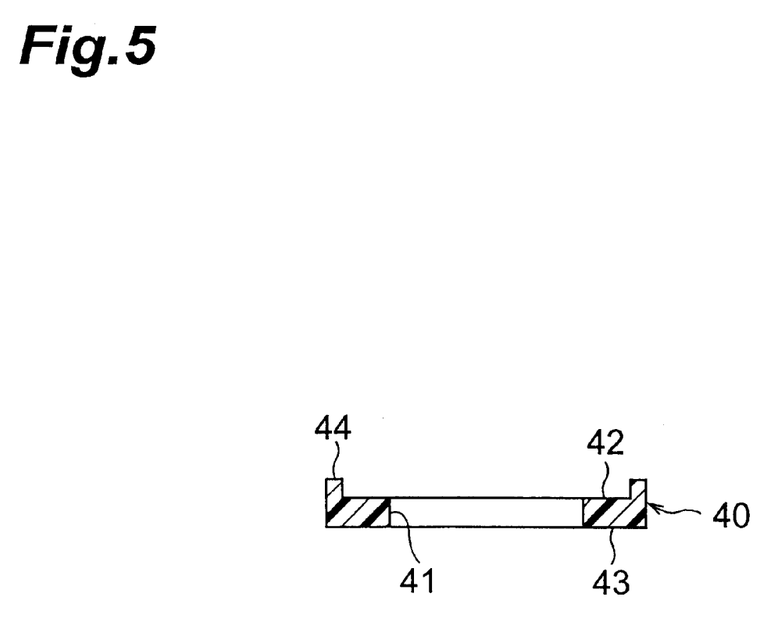
FIG. 5 is a cross sectional view of the stopper taken along the line V—V of FIG. 4.

The stopper 40 is a circular sheet, as shown in FIGS. 4 and 5, having a through hole 41 in the center thereof. One side of the stopper 40 acts as a contact surface 42 in contact with the stem 12 of the photomultiplier 10 and the other side functions as a supported surface 43 seated on the step 34 of the module case 30. The contact surface 42 of the stopper 40 has an annular projection 44 provided thereon. The stopper 40 may be made of polyamide-imide resin such as "TORLON" (producted by NIPPON POLYPENCO), or of polyimide resin such as "UPIMOL" (producted by UBE INDUSTRIES,LTD), "CEPLA" (producted by SHINNISSANDIA) and the like, having a higher resistance to heat, a higher physical strength and a higher electric non-conductance.

The photomultiplier 10 and the bleeder circuit board 20 are electrically and mechanically connected to each other by a plurality of stem pins 13 which extend from the stem 12 of the photomultiplier 10. The stopper 40 is joined at its contact surface 42 directly to the stem 12 of the photomultiplier 10 of which a plurality of stem pins 13 are inserted into the through hole 41 and is disposed between the photomultiplier 10 and the bleeder circuit board 20.

A plurality of leads 24 extending from the bleeder circuit board 20 are provided for further connection to external circuits not shown.

Figure 3B:
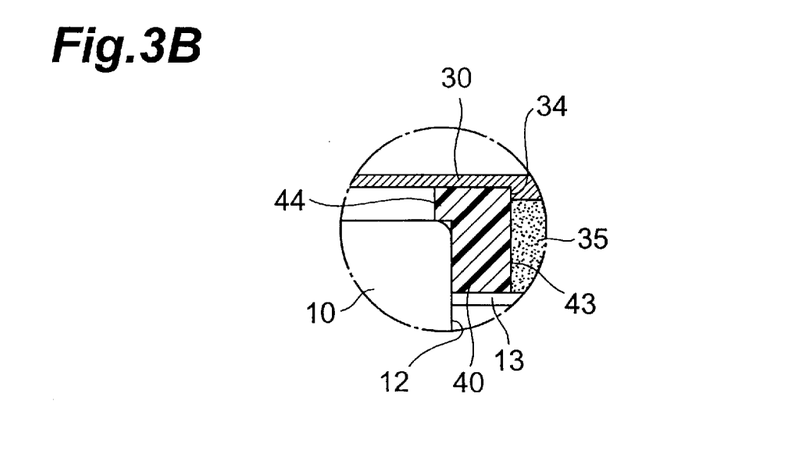
FIG. 3B is an enlarged view of a region denoted by B in FIG. 3A.

The photomultiplier 10, the bleeder circuit board 20, and the stopper 40 are installed in the module case 30. In the installation, the position of the photomultiplier 10 along the axis X in the module case 30 is defined by the supported surface 43 of the stopper 40 in contact with the step 34 of the module case 30, as shown in FIGS. 3A and 3B. Also, the photomultiplier 10 is positioned in the module case 30 along a direction vertical to the axis X as its side is in contact with the projection 44 on the contact surface 42 of the stopper 40. More specifically, the photomultiplier 10 in this embodiment is positioned so that its faceplate 11 projects out substantially 1 mm from the opening 31 of the module case 30.

The space in the module case 30 where the bleeder circuit board 20 is installed is filled up with silicon resin 35 by potting. This protects and holds the bleeder circuit board 20 at place in the module case 30.

Also, the space between the photomultiplier 10 and the module case 30 is shut with a size of TEFLON (Polytetrafluoroethylene) tape 36 and filled up with silicon resin 37 by potting. This prevents the photomultiplier 10 from sliding in the module case 30.

Figure 6:
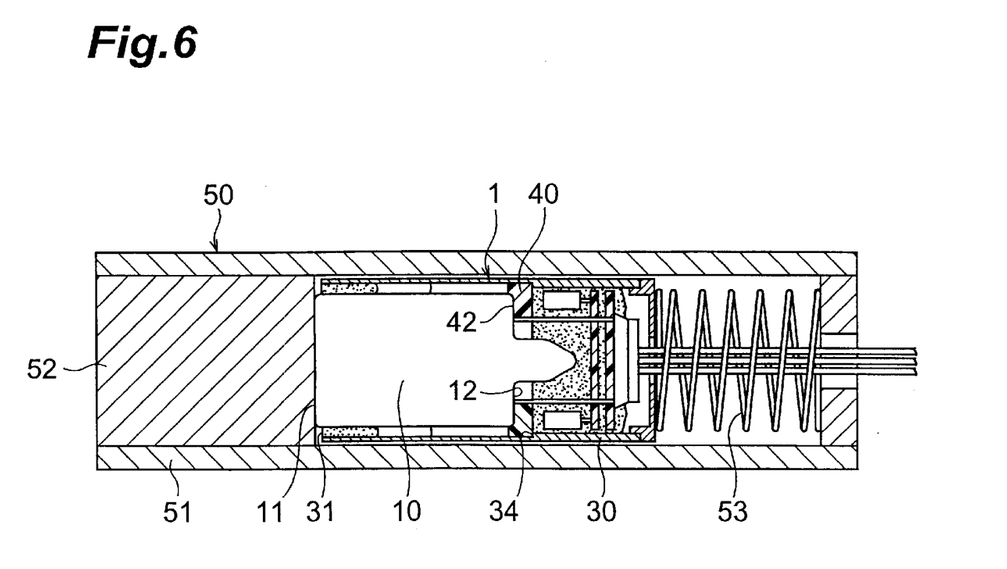
FIG. 6 is a cross sectional view of a structure of a radiation detector apparatus equipped with the light-receiving module of the first embodiment.

FIG. 6 is a cross sectional view showing a structure of a radiation detecting apparatus 50 equipped with the light-receiving module 1 of the first embodiment. As illustrated, the radiation detecting apparatus 50 has a scintillator 52 which emits light upon absorbing radiation energy, the above-described light-receiving module 1, and a spring 53 pressing the light-receiving module 1 against the scintillator 52 which all are installed in a cylindrical housing 51 thereof made of stainless steel. More particularly, the light-receiving module 1 is pressed against the scintillator 52 by the yielding force of 20 kgf or more, of the spring 53 while the faceplate 11 of the photomultiplier 10 is in contact with the scintillator 52. By tightly coupling the light-receiving module 1 with the scintillator 52, its susceptibility to vibration can be reduced.

In the light-receiving module 1 of the present invention, the photomultiplier 10 is correctly positioned in the module case 30 by interaction between the step 34 and the stopper 40 regardless of the effect of external conditions.

The radiation detecting apparatus 50 equipped with the light-receiving module 1 holds the photomultiplier 10 precisely between the scintillator 52 and the stopper 40 seated on the step 34 of the module case 30. Accordingly, the coupling between the scintillator 52 and the light-receiving module 1 can be maintained satisfactorily under a high temperature and an unfavorable degree of vibration, hence minimizing declination in the detection accuracy during the action of the radiation detecting apparatus 50.

It is understood that the present invention is not limited to the first embodiment.

Figure 7:
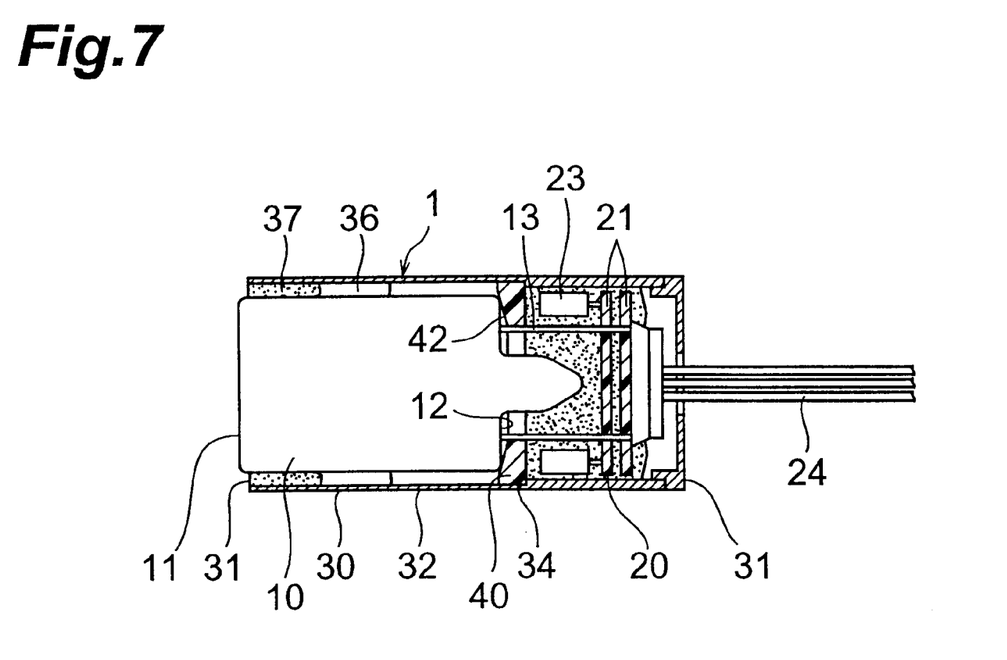
FIG. 7 is a cross sectional view of a structure of a second embodiment of the light-receiving module according to the present invention.
Figure 8:
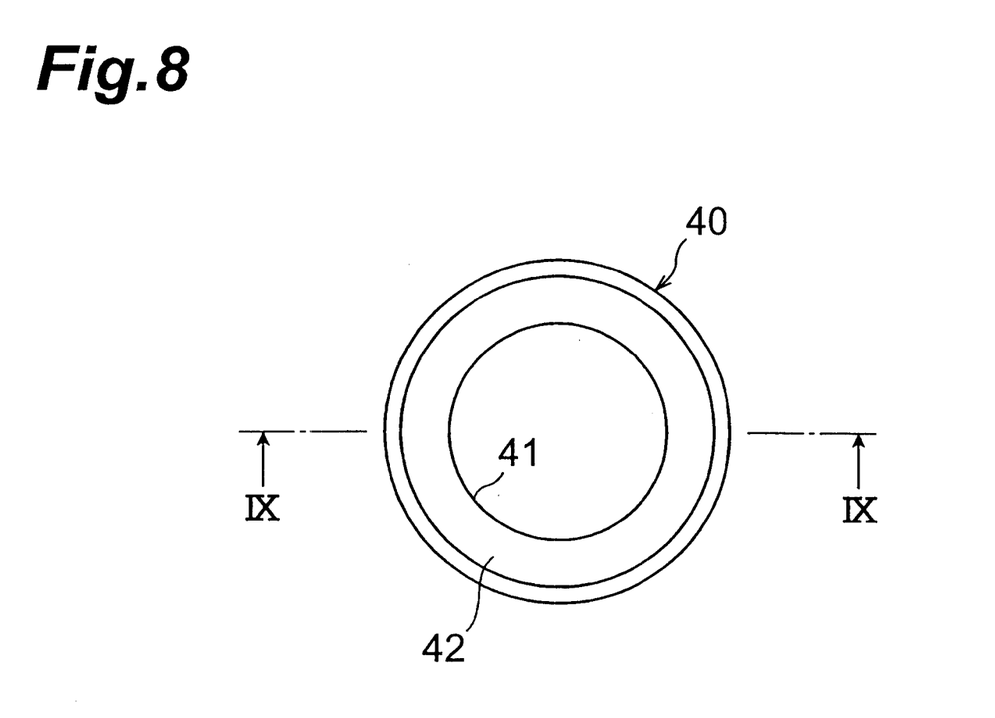
FIG. 8 is a plan view of a stopper in the light-receiving module of the second embodiment.
Figure 9:
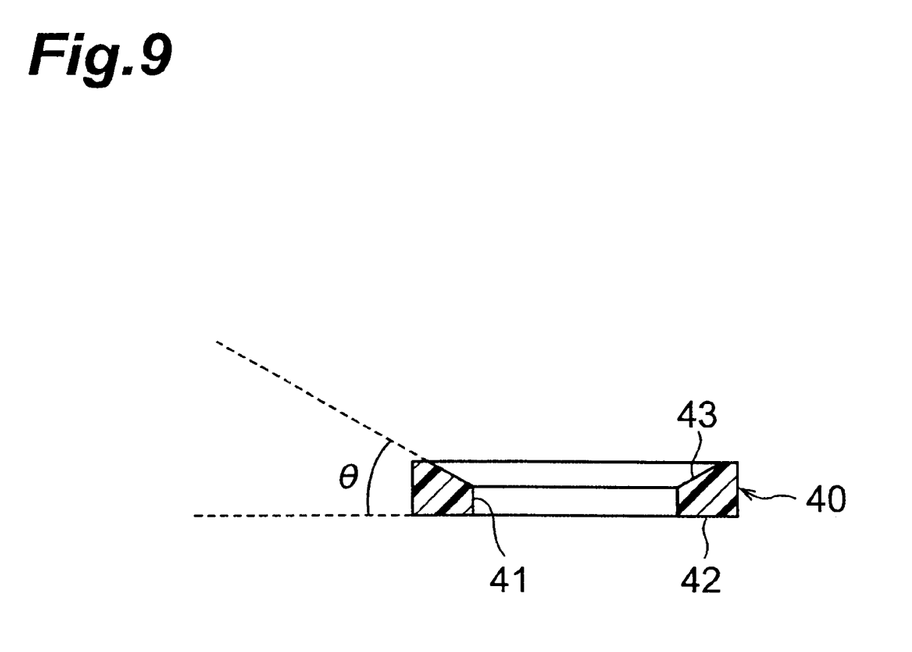
FIG. 9 is a cross sectional view of the stopper taken along the line IX—IX of FIG. 8.

FIG. 7 is a cross sectional view showing a second embodiment of a light-receiving module of the present invention. The light-receiving module 1 of the second embodiment is differentiated from that of the first embodiment by a modified structure of the stopper 40. As shown in FIGS. 8 and 9, the contact surface 42 of the stopper 40, which is in contact with the stem 12 of the photomultiplier 10, is tilted with respect to the center axis X of the module case 30. In other words, the contact surface 42 is sloped so that thickness of the stopper 40 becomes smaller towards a through hole 41. The angle θ between the tilted contact surface 42 and the supported surface 43 is determined depending on the size of the photomultiplier 10 and preferably about 30 degrees.

As described with the first embodiment shown in FIG. 6, the light-receiving module 1 of the radiation detecting apparatus 50 is coupled at the faceplate 11 of the photomultiplier 10 to the scintillator 52. Since the distance between the module case 30 and the housing 51 is very small, the coupling between the light-receiving module 1 and the scintillator 52 may hardly be satisfied unless the opening 31 of the module case 30 is closely set in parallel with the faceplate 11. It is thus essential to establish a significant degree of parallelism between the opening 31 of the module case 30 and the faceplate 11.

When the photomultiplier 10 with its faceplate 11 and stem 12 arranged not in parallel relationship is positioned by the stopper 40 in the first embodiment of which the contact surface 42 and the supported surface 43 are parallel to each other as shown in FIGS. 4 and 5, it may not always be aligned in parallel with the opening 31 of the module case 30.

In that case, the parallelism may forcibly be achieved with the use of a jig before securing the photomultiplier 10 at place in the module case 30 by potting, which however causes the stem 12 to come only partially in contact with the stopper 40. When the force of 20 kgf or higher is applied, it will hardly be distributed evenly to the entirety of the faceplate 11 hence giving adverse effects on the coupling between the scintillator 52 and the light-receiving module 1. Also, stresses will be converged on the interface between the stem 12 and the stopper 40, thus causing damage to the photomultiplier 10.

On the contrary, the stopper 40 in the light-receiving module 1 of the second embodiment has the contact surface 42 tilted with respect to the axis X. This allows the stem 12, even if it is not parallel to the faceplate 11, to be adjusted in its contact setting to align the faceplate 11 of the photomultiplier 10 in parallel with the opening 31 of the module case 30.

Figure 10:
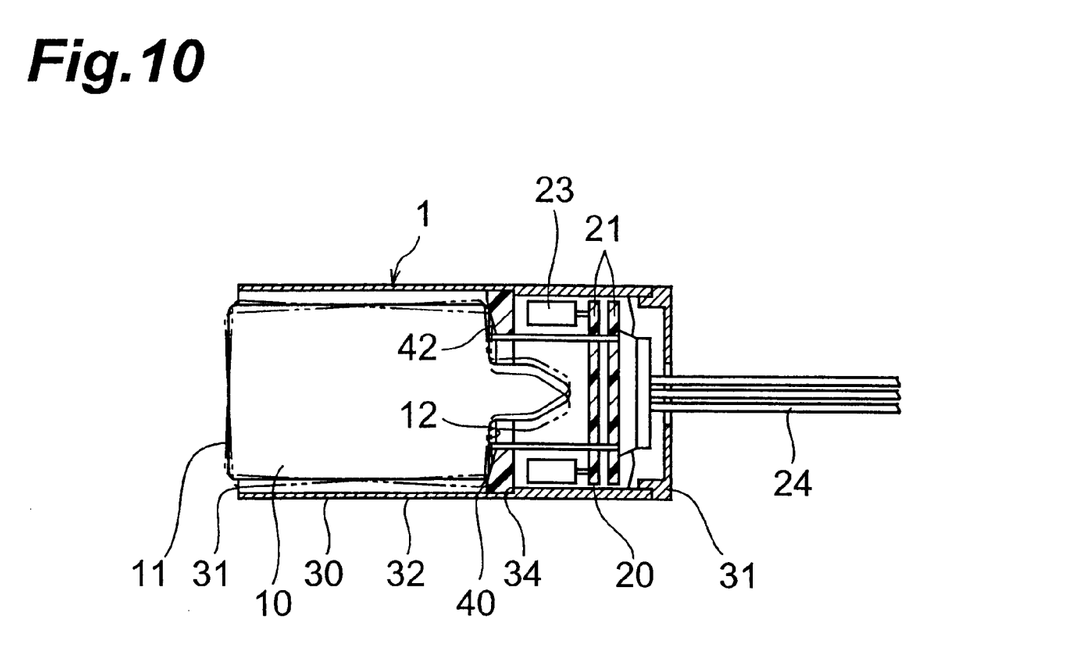
FIG. 10 is a cross sectional view showing an action of controlling the parallelism of a faceplate in the light-receiving module of the second embodiment.

FIG. 10 is a cross sectional view of the light-receiving module 1 explaining a mechanism for having a parallelism between the face plate 11 of the photomultiplier 10 and the opening 31 of the module case 30. As shown, the stem 12 and the contact surface 42 are favorably controlled in their contact position thus to tilt the faceplate 11 by minimal degrees, thus achieving the parallelism between the faceplate 11 and the opening 31 of the module case 30.

Figure 11:
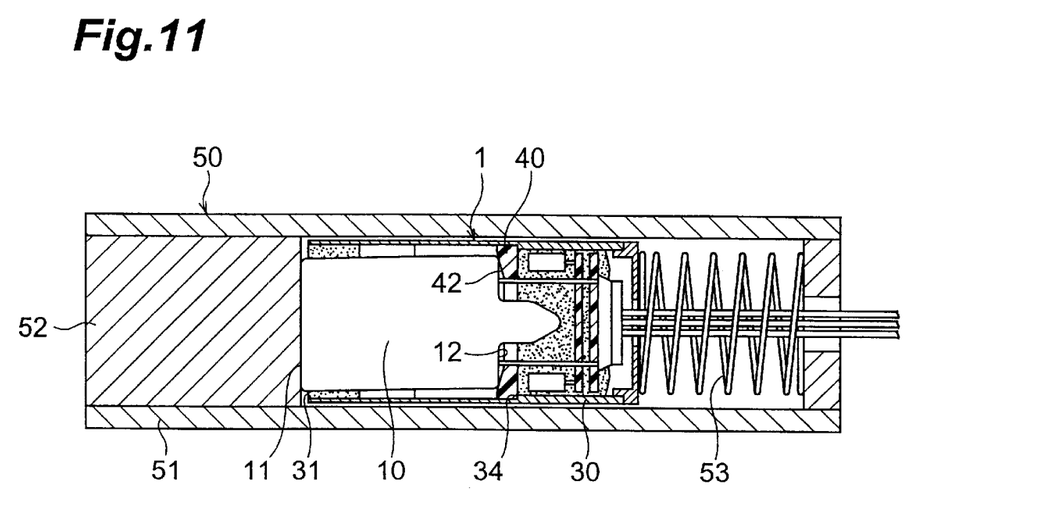
FIG. 11 is a cross sectional view of a structure of a radiation detecting apparatus equipped with the light-receiving module of the second embodiment.

FIG. 11 is a cross sectional view showing a structure of a radiation detecting apparatus 50 equipped with the light-receiving module 1 of the second embodiment.

As shown, while the photomultiplier 10 of the light-receiving module 1 has its faceplate 11 and stem 12 arranged not in parallel, the stem 12 and the contact surface 42 of the stopper 40 are controlled to align the faceplate 11 in parallel with the opening 31 of the module case 30 and simultaneously the stem 12 is seated at its rim portion directly on the contact surface 42 of the stopper 40.

As a result, the force applied by the spring 53 is distributed evenly onto the entire surface of the faceplate 11, hence ensuring a higher level of the coupling between the light-receiving module 1 and the scintillator 52. Also, the stem 12 is prevented from locally receiving a convergence of stress, thus minimizing the damage to the photomultiplier 10.

While the light-receiving module 1 of the second embodiment provides the same effect as of the first embodiment, it can favorably be coupled to the scintillator 52 even with the faceplate 10 and the stem 12 of the photomultiplier 10 arranged not in parallel and can also prevent the stem 12 from locally receiving a convergence of stress thus to minimize the damage to the photomultiplier 10.

Comparative examples conducted by the present inventors for proving the effects of the present invention will now be described.

Figure 12:
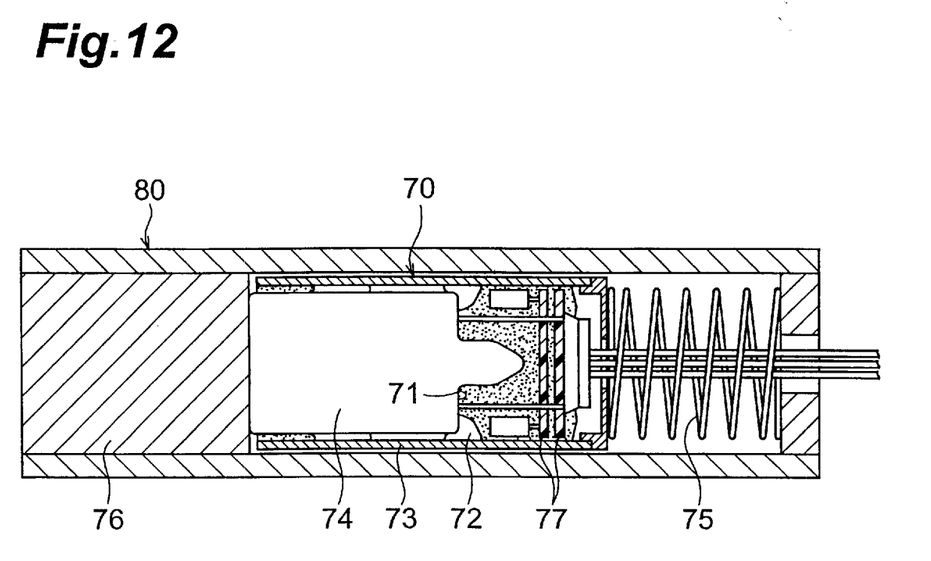
FIG. 12 is a cross sectional view of a structure of a radiation detecting apparatus equipped with a comparative light-receiving module used by the inventors for comparison to prove the effect of the present invention.

FIG. 12 is a cross sectional view showing a structure of a radiation detecting apparatus 80 equipped with a comparative light-receiving module 70. The comparative light-receiving module 70 has a photomultiplier 74 positioned in place in a module case 73 with the use of a heat-resistant epoxy resin adhesive 72 applied in an annular fashion to the rim of a stem 71.

Figure 13:
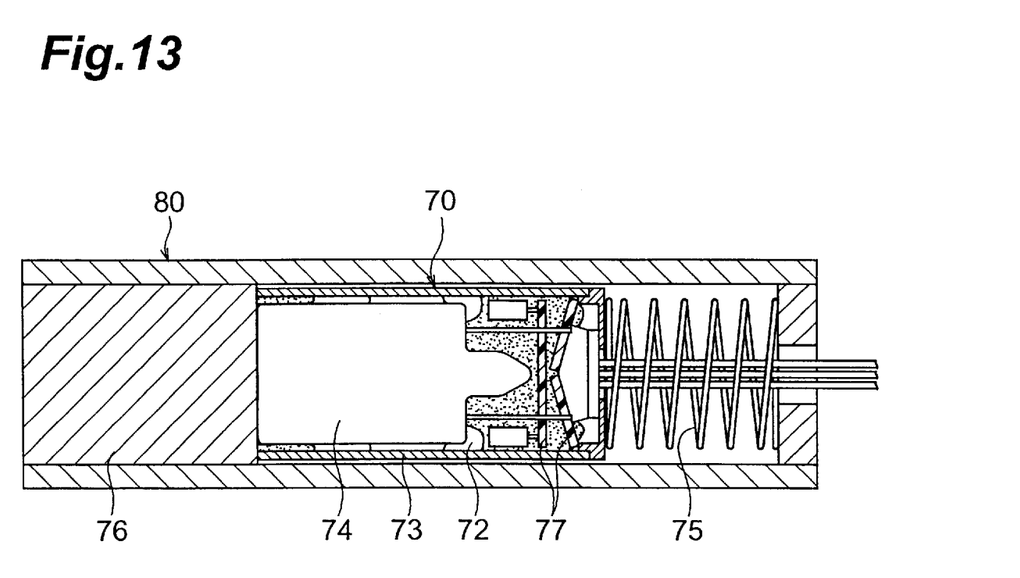
FIG. 13 is a cross sectional view showing a state where a photomultiplier is slid to injure a bleeder circuit board in a module case of the radiation detecting apparatus equipped with the comparative light-receiving module.

As the result of our experiments, the epoxy resin adhesive 72 in the light-receiving module 70 was softened at a higher temperature, hence allowing the yielding force of a spring 75 to press and slide the photomultiplier 74 along the module case 73 until the photomultiplier 74 moved into the module case 73 as shown in FIG. 13. Accordingly, a scintillator 76 directly hit against the module case 73 thus being injured. Otherwise, when the displacement of the photomultiplier 74 was too large, the yielding force of the spring 75 failed to act its role, discouraging the coupling between the light-receiving module 70 and the scintillator 76. Also, the sliding movement of the photomultiplier 74 caused damage to a bleeder circuit board 77. Those unfavorable effects may result in declination in the detecting accuracy during the action of the radiation detecting apparatus 80.

With a thermally stable ceramic adhesive instead of the epoxy resin adhesive 72, the photomultiplier 74 was positioned in the module case 73. As a result, the ceramic adhesive was fractured by the yielding force of the spring 75 hence permitting the photomultiplier 74 to slide in and along the module case 73 similar to the movement when the epoxy resin adhesive was used.

The light-receiving module 1 of the embodiment utilizes a combination of the step 34 and the stopper 40 seated on the step 34 to position the photomultiplier 10 securely in the module case 30. This allows the coupling between the light-receiving module 1 and the scintillator 52 in the radiation detecting apparatus 50 equipped with the light-receiving module 1 to be securely maintained under hostile conditions of a higher temperature and an unfavorable degree of vibration, thus significantly minimizing declination in the detecting accuracy during the action of the radiation detecting apparatus 50.

The light-receiving module and the radiation detecting apparatus of the present invention are not limited to the foregoing embodiments but various changes and modifications may be made.

For instance, the step 34 in the module case 30 is increased in the size to allow direct contact between the step 34 and the stem 12 and permit the step 34 to act as the stopper 40. Accordingly, the stopper 40 is eliminated and the number of the entire components will be decreased.

Also, the step 34 is not necessarily made in an annular form. Instead, a plurality of steps may be provided at proper intervals in the module case 30. More specifically, a group of projections are formed as the steps in the module case 30 to support the stopper 40 at their respective points.

The stopper 40 is not necessarily made of a single circular plate but may be consisted of multiple members.

The projection 44 on the contact surface 42 of the stopper 40 is not necessarily made of a ring-like shape but may comprise a plurality of raised portions separately formed on the contact surface 42. It is preferred to have at least three raised portions arranged at equal intervals.

As set forth above, the present invention allows the stopper seated on the step provided in the inner surface of the module case to securely position the photomultiplier in the module case. Accordingly, in the radiation detecting apparatus of the present invention, the coupling between the light-receiving module and the scintillator to be favorably maintained under hostile conditions of a higher temperature and an unfavorable degree of vibration, hence providing a significant advantage of minimizing declination in the detecting accuracy during the action of the radiation detecting apparatus.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A light-receiving module comprising:
   a photomultiplier having a faceplate and a stem opposing each other;
   a bleeder circuit board provided so as to sandwich said stem together with said faceplate and electrically connected to said photomultiplier;
   a plurality of stem pins extending from said stem, said pins being electrically and mechanically connected to said bleeder circuit board;
   a module case provided so as to accommodate said photomultiplier, said bleeder circuit board, and said pins, said module case having an opening for exposing said faceplate of said photomultiplier;
   a step provided on an inner surface of said module case; and
   a stopper seated on said step, defining the position of said photomultiplier in said module case.

2. A light-receiving module according to claim 1, wherein said step provided on said inner surface of said module case functions as said stopper.

3. A light-receiving module according to claim 1, wherein said stopper has a contact surface in contact with said stem of said photomultiplier, and a projection is formed on said contact surface.

4. A light-receiving module according to claim 1, wherein said stopper has a contact surface in contact with said stem of said photomultiplier, said contact surface being tilted with respect to a center axis of said module case.

5. A light-receiving module according to claim 1, wherein said stopper is made of one of polyamide-imide resin and polyimide resin.

6. A light-receiving module according to claim 1, wherein a space in said module case where said bleeder circuit board is accommodated is filled with a potting compound.

7. A light-receiving module according to claim 1, wherein a space between the side wall of said photomultiplier and said module case is filled with a potting compound.

8. A radiation detecting apparatus comprising:
   a scintillator for converting incident radiation into light;
   a light-receiving module having:
      a photomultiplier including a faceplate and a stem opposing each other, said faceplate being in direct contact with said scintillator;
      a bleeder circuit board provided so as to sandwich said stem together with said faceplate and electrically connected to said photomultiplier;
      a plurality of stem pins extending from said stem, said pins being electrically and mechanically connected to said bleeder circuit board;
      a module case provided so as to accommodate said photomultiplier, said bleeder circuit board, and said pins, said module case including an opening for exposing said faceplate of said photomultiplier;
      a step provided on an inner surface of said module case; and
      a stopper seated on said step, defining the position of said photomultiplier in said module case;
   a housing for accommodating said scintillator and said light-receiving module; and
   means for pressing said light-receiving module against said scintillator.

9. A light-receiving module comprising:
   a photomultiplier having a faceplate and a stem opposing each other;
   a bleeder circuit board provided so as to sandwich said stem together with said faceplate and electrically connected to said photomultiplier;
   a plurality of stem pins extending from said stem, said pins being electrically and mechanically connected to said bleeder circuit board;
   a module case provided so as to accommodate said photomultiplier, said bleeder circuit board, and said pins, said module case having an opening for exposing said faceplate of said photomultiplier;
   a step provided on an inner surface of said module case; and
   a stopper seated on said step, defining the position of said photomultiplier in said module case and having a contact surface in contact with said stem of said photomultiplier, said contact surface being tilted with respect to a center axis of said module case.

10. A light-receiving module according to claim 9, wherein said step provided on said inner surface of said module case functions as said stopper.

11. A light-receiving module according to claim 9, wherein said stopper is made of one of polyamide-imide resin and polyimide resin.

12. A light-receiving module according to claim 9, wherein a space in said module case where said bleeder circuit board is accommodated is filled with a potting compound.

13. A light-receiving module according to claim 9, wherein a space between the side wall of said photomultiplier and said module case is filled with a potting compound.

14. A radiation detecting apparatus comprising:

a scintillator for converting incident radiation into light;

a light-receiving module having:
- a photomultiplier including a faceplate and a stem opposing each other, said faceplate being in direct contact with said scintillator;
- a bleeder circuit board provided so as to sandwich said stem together with said faceplate and electrically connected to said photomultiplier;
- a plurality of stem pins extending from said stem, said pins being electrically and mechanically connected to said bleeder circuit board;
- a module case provided so as to accommodate said photomultiplier, said bleeder circuit board, and said pins, said module case including an opening for exposing said faceplate of said photomultiplier;
- a step provided on an inner surface of said module case; and
- a stopper seated on said step, defining the position of said photomultiplier in said module case and including a contact surface in contact with said stem of said photomultiplier, said contact surface being tilted with respect to a center axis of said module case;

a housing for accommodating said scintillator and said light-receiving module; and means for pressing said light-receiving module against said scintillator.

15. A radiation detecting apparatus according to claim 8, wherein said means for pressing said light-receiving module is accommodated in a space defined by said module case and said housing.

16. A radiation detecting apparatus according to claim 14, wherein said means for pressing said light-receiving module is accommodated in a space defined by said module case and said housing.

* * * * *